United States Patent [19]

van Hout et al.

[11] Patent Number: 5,512,620
[45] Date of Patent: Apr. 30, 1996

[54] BENZOXAZOLYL OPTICAL BRIGHTNERS IN AND FOR THERMOPLASTIC COMPOSITIONS

[75] Inventors: Henricus H. M. van Hout, Halsteren, Netherlands; James F. Hoover, Evansville, Ind.; Karl H. Roell; Augustina M. Willemsen, both of Bergen op Zoom, Netherlands

[73] Assignee: General Electric Company, Pittsfield, Mass.

[21] Appl. No.: 238,288

[22] Filed: May 5, 1994

[51] Int. Cl.$^6$ .......................... C08K 5/45; C07D 263/62
[52] U.S. Cl. .................. 524/84; 524/140; 252/301.25; 252/301.32; 430/933; 548/220
[58] Field of Search .................. 524/84, 140; 548/220; 252/301.25, 301.32; 430/933

[56] References Cited

U.S. PATENT DOCUMENTS

| | | | |
|---|---|---|---|
| 3,135,762 | 6/1964 | Maeder et al. | 548/220 |
| 3,136,773 | 6/1964 | Maeder et al. | 524/84 |
| 3,449,257 | 6/1969 | Tuite et al. | 430/933 |
| 3,501,298 | 3/1970 | Crawford | 430/933 |
| 4,066,611 | 1/1978 | Axelrod | 260/45.8 A |
| 4,189,866 | 2/1980 | Treadaway | 252/301.32 |
| 4,385,145 | 5/1983 | Horn | 524/120 |
| 4,679,795 | 7/1987 | Melvin et al. | 524/84 |
| 4,847,149 | 7/1989 | Kiyohara et al. | 548/220 |
| 5,071,993 | 12/1991 | Leppard et al. | 548/220 |

FOREIGN PATENT DOCUMENTS

| | | |
|---|---|---|
| 359710 | 3/1990 | European Pat. Off. . |
| 974149 | 11/1964 | United Kingdom . |

*Primary Examiner*—Richard L. Schilling

[57] ABSTRACT

Benzoxazolyl brightner compounds and thermoplastic combinations containing such are provided herein. The thermoplastic compositions comprise a thermoplastic resin, a phosphite heat stabilizer present in reduced levels, a brightner present in reduced levels and a pigment. Preferably the thermoplastic resin composition is transparent in nature. The compositions are useful for making molded and blow molded articles which require high levels of transparency, for example, glazing materials such thermoplastic windows. The composition exhibits enhanced appearance, namely a bright natural color in combination with low levels of yellowness by utilizing in combination reduced levels of phosphite and reduced levels of brightner, with moderate levels of pigment.

14 Claims, No Drawings

BENZOXAZOLYL OPTICAL BRIGHTNERS IN AND FOR THERMOPLASTIC COMPOSITIONS

BACKGROUND OF THE INVENTION

1. Field of the Invention

The present invention relates to benzoxazolyl optical brightners, and more particularly relates to benzoxazolyl optical brightners and thermoplastic compositions containing benzoxazolyl optical brightners.

2. Description of the Related Art

Organic phosphite stabilizers have been previously used to stabilize various thermoplastic compositions, including polyolefins, aromatic polycarbonates, and polyesters. For example, Horn, Jr., U.S. Pat. No. 4,385,145, issued May 24, 1983, discloses utilizing from about 0.05 to about 1.0 percent by weight pentaerythritol diphosphite ester as a stabilizer for poly(alkylene terephthalate); and Axelrod, U.S. Pat. No. 4,066,611, discloses a stabilized aromatic polycarbenate composition containing small proportions of bis(2, 4-ditertiarybutylphenyl)pentaerythritol diphosphite and an epoxy compound. The utilization of phosphite aromatic stabilizers in polycarbonate resin can reduce the generation of yellow degradation products, but degradation of the phosphite product into phosphoric acid during extended exposure of the thermoplastic resin to moisture at an elevated temperature can result in an increase in hazing in the composition. Additionally, utilization of 2,2'-(2,5-thiophenediyl)bis(5-tertbutylbenzoxazole) as an optical brightner for polycarbonate resins has been disclosed in Federal Register Volume 53, No. 87, Friday, May 4, 1990, page 18721–18722. Product literature set out for Optiblanc PL by 3V Sigma sets out that benzoxazole,2,2'-(2,5-thiophendlyl)-bis(5-(1,1-dimethylethyl)(or 2,5-bis(5-tertbutylbenzoxazole-2-yl)thiophene) is useful as a fluorescent whitening agent for thermoplastic materials, and sets out that for nonpigmented thermoplastics it is efficient to add small quantifies of the compound in order to compensate for the "yellow" color of the substrate, with recommended additive levels being between 0.001 and 0.05 percent, and further setting out that in the case of thermoplastic with white pigments and in particular in case of pigmentation with titanium dioxide, the recommended addition levels are between 0.01 to 0.2 percent, and that there is a possibility to combine the fluorescent whiting agent with bluing materials.

Accordingly, an object of the present invention is to provide thermoplastic compositions with reduced level of phosphite stabilizer, which exhibit low yellowness levels, which preferably exhibit bright natural color, and which is more preferably transparent.

SUMMARY OF THE INVENTION

The present invention provides benzoxazolyl compounds and thermoplastic compositions containing benzoxazolyl compounds. The compositions are preferably pigmented compositions utilizing a reduced level of phosphite stabilizer, but exhibiting low levels of yellowness, preferably a bright natural color, most preferably being transparent. The compositions comprise (a) a thermoplastic resin, preferably polycarbonate or polyalkylene terephthalate, (b) a benzoxazolyl brightner compound, (c) a bluing pigment, and (d) a low level of a phosphorous heat stabilizer. Specific benzoxazolyl compounds are also provided.

DETAILED DESCRIPTION OF THE INVENTION

The thermoplastic resin may be a number of thermoplastic resins known in the art to benefit from the presence of optical brighteners. Preferred thermoplastic resins according to the invention include, e.g., polyesters such as polycarbonate and polyalkylene terephthalate; polyolefins such as polyethylene and polypropylene; polyvinyl aromatic resins; polyethers; polyimides and blends of the above. Since polycarbonate is the most preferred thermoplastic resin, the invention will be described using polycarbonate as the thermoplastic resin.

The polycarbonate component included in the compositions may be any aromatic homo-polycarbonate or co-polycarbonate known in the art. The polycarbonate component may be prepared in accordance with any of the processes generally known in the art, for example, by the interfacial polycondensation process, polycondensation in a homogeneous phase or by transesterification. These processes and the associated reactants, polymers, catalysts, solvents and conditions are well known in the art and are described in U.S. Pat. Nos. 2,964,974; 2,970,137; 2,999,835; 2,999,846; 3,028,365; 3,153,008; 3,187,065; 3,215,668; 3,258,414 and 5,010,162, all of which are incorporated herein by reference. Suitable polycarbonates are based, for example, on one or more of the following bisphenols: dihydroxy diphenyls, bis-(hydroxyphenyl)-alkanes, bis-(hydroxyphenyl)-cycloalkanes, bis-(hydroxyphenyl)sulphides, bis-(hydroxyphenyl)-ethers, bis-(hydroxyphenyl)-ketones, bis-(hydroxyphenyl)-sulphoxides, bis-(hydroxyphenyl)-sulphones, alkyl cyclohexylidene bisphenols, a,a-nod-(hydroxyphenyl)diisopropyl benzenes, and their nucleus-alkylated and nucleus-halogenated derivatives, and mixtures thereof.

Specific examples of these bisphenols are 4,4-dihydroxy diphenyl, 2,4-bis-(4-hydroxyphenyl)-propane, 2,4-bis-(4-hydroxyphenyl)-2-methyl butane, 1,1-bis-(4-hydroxyphenyl)-cyclohexane, a,a-bis-(4-hydroxyphenyl)-diisopropyl benzene, 2,2-bis(3-methyl-4-hydroxyphenyl)propane, 2,2-bis-(3-chloro-4-hydroxyphenyl)propane, 2, 2-bis-(3-chloro-4-hydroxyphenyl)propane, bis-(3,5-dimethyl-4-hydroxyphenyl)-methane, 2, 2-bis-(3,5-dimethyl-4-hydroxyphenyl)propane, bis-(3,5-dimethyl-4-hydroxyphenyl)-sulphone, 2,4-bis-(3,5-dimethyl-4-hydroxyphenyl)-2-methyl butane, 1,1-bis-(3,5-dimethyl-4-hydroxyphenyl)-cyclohexane, a,a-bis-(3,5-dimethyl-4-hydroxyphenyl)-p-diisopropyl benzene, 2,2-bis-(3,5-dichloro-4-hydroxyphenyl)-propane and 2,2-bis-(3,5-dibromo-4-hydroxyphenyl)-propane. A particular preferred bisphenol is 2,2-bis-(4-hydroxyphenyl)-propane, more commonly known as bisphenol A. The bisphenols may be reacted with phosgene to produce the aromatic polycarbonates.

As indicated above, the thermoplastic resin may also be a polyester. Polyesters have been known to exhibit greying or hazing when exposed to high levels of phosphite. Suitable polyesters are the linear thermoplastic polyesters in the resinous compositions of this invention usually comprise structural units of the formula:

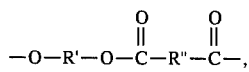

wherein each of R' and R" is a divalent aliphatic, alicyclic or aromatic radical containing about 2–10 carbon atoms. At least about 30 of said units are usually present, with at least about 50 being preferred. Such linear polyesters are typically prepared by the known reaction of dihydroxy compounds with dicarboxylic acids or functional derivatives thereof such as anhydrides, acid chlorides or lower alkyl (especially methyl) esters, preferably the esters.

The R' radicals may be one or more aliphatic, alicyclic or aromatic radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10decanediol, 1,4-cyclohexanedimethanol, 2-butene-1,4-diol, resorcinol, hydroquinone and bisphenol A. They may also be radicals containing substituents which do not substantially alter the reactivity of the dihydroxy compound (e.g., alkoxy, halo, nitrile or hetero atoms (e.g., oxygen or sulfur).

The R" radicals may be derived from such acids as succinic, adipic, maleic, isophthalic and terephthalic acids or similar substituted and hetero atom-containing acids. It usually contains about 6–10 carbon atoms.

Most often R' and R" are hydrocarbon radicals. Preferably, R' is aliphatic and especially saturated aliphatic and R" is aromatic. The polyester is most desirably a poly (alkylene terephthalate), particularly poly (ethylene terephthalate) or poly(1,4-butylene terephthalate) (hereinafter sometimes simply "polyethylene terephthalate" and "polybutylene terephthalate", respectively) and especially the latter. Such polyesters are known in the art as illustrated by the following United States patents:

| | |
|---|---|
| 2,465,319 | 3,047,539 |
| 2,720,502 | 3,671,487 |
| 2,727,881 | 3,953,394 |
| 2,822,348 | 4,128,526 |

The polyesters preferably have number average molecular weights in the range of about 10,000–70,000, as determined by gel permeation chromatography or by intrinsic viscosity (IV) at 30° C., in a mixture of 60% (by weight) phenol and 40% 1,1,2,2,-tetrachloroethane.

The thermoplastic resin composition preferably comprises at least 80 percent by weight of the thermoplastic resin based on the entire weight of the composition, more preferably 90 percent by weight thereof, more preferably at least 95 percent by weight thereof, most preferably at least 99 percent by weight thereof. Preferably the thermoplastic composition is transparent, exhibiting a transparency level of at least 99 percent visible light.

The brightner compound may be of the formula (I):

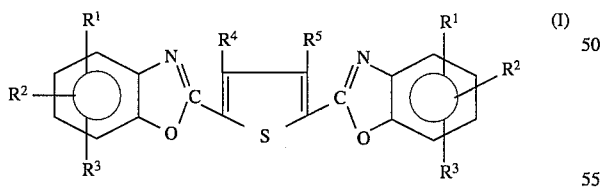

wherein $R^1$, $R^2$ and $R^3$ represent hydrogen or certain non-chromophoric substituents and each of $R^4$ and $R^5$ independently represents a hydrogen atom or an alkyl group. $R^1$ represents hydrogen, halogen, alkyl of 1 to 18 carbon atoms, haloalkyl, hydroxyalkyl, alkoxyalkyl or cyanoalkyl, each containing 1 to 8 carbon atoms in the alkyl moiety, phenylalkyl containing 1 to 4 carbon atoms in the alkyl moiety whilst the phenyl moiety can be substituted by alkyl groups of 1 to 4 carbon atoms; an alkyl group of 1 to 8 carbon atoms which is substituted by the carboxyl group or a functional derivative thereof, alkenyl of 2 to 4 carbon atoms, cycloalkyl of 5 or 6 carbon atoms, alkoxy of 1 to 6 carbon atoms, phenylalkoxy containing 1 to 4 carbon atoms in the alkoxy moiety, phenoxy, phenyl, each of which can be substituted by halogen, alkoxy or alkyl of 1 to 4 carbon atoms; the carboxy group or a functional derivative thereof, cyano, alkylsulphonyl of 1 to 18 carbon atoms or the sulpho group or a functional derivative thereof, $R^2$ represents hydrogen, alkyl of 1 to 6 carbon atoms, alkoxy of 1 to 4 carbon atoms or halogen, $R^3$ represents hydrogen, chlorine or alkyl of 1 to 4 carbon atoms, and each of $R^4$ and $R^5$ independently represents hydrogen, alkyl of 1 to 10 carbon atoms or together they represent the trimethylene or tetramethylene radical.

Preferably each $R^1$ and each $R^3$ is hydrogen and each $R^2$ is a tertbutyl group. Also preferably, each $R^1$ and $R^3$ is hydrogen, and $R^2$ is selected from hydrogen, lower alkyl, and C1–C8 ester groups. Suitable benzoxazolyl compounds are set out in U.S. patents Guglielmetti, U.S. Pat. No. 4,267,343, issued May 12, 1981, and Schreiber, U.S. Pat. No. 4,327,209, issued Apr. 27, 1982, both of which are incorporated herein by reference.

A suitable specific brightner compound is 2,2'-(2,5-thiophenediyl)bis-( 5-tert-butylbenzoxazole) which may be represented by the formula (II)

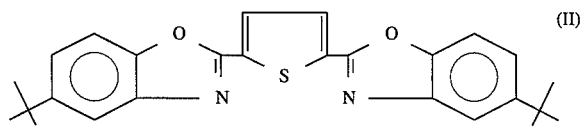

Additionally, for the manufacturing of polycarbonate by interfacial process involving the reaction of, for example, bisphenol A with phosgene, the incorporation of a benzoxazolyl compound containing hydroxy groups would be ideal. Suitable benzoxazolyl compound may be represented by the formula (III)

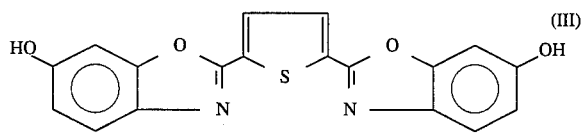

which may be obtained by the following reaction sequence.

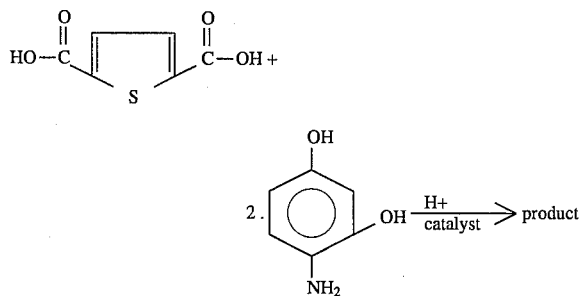

wherein the suitable catalyst may be any organic or inorganic acid, including Lewis acids, which are known to be suitable for esterification reactions. Alternatively, a compound having high hydroxy groups which could be utilized may be represented by the following formula (IV)

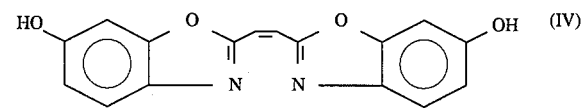

which may be derived by the following sequence involving fumaric acid:

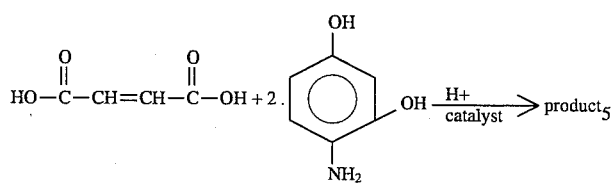

to yield the above product.

Similarly, as indicated in the formula (I), the hydrogen for formulas (II), (III), and (IV), could be replaced by an $R^1$ moiety wherein $R^1$ represents halogen, alkyl, haloalkyl, hydroxyalkyl, alcoxyalkyl, or cyanoalkyl. By the same token, if the hydroxy group were to react or otherwise attach to a portion of a thermoplastic resin structure, the R group could represent the thermoplastic resin structure of, e.g., polycarbonate, polyester, polyolefin, polyvinyl aromatic compounds, polyethers or polyimides. Each of these particular resins and their structures is well known to those of ordinary skill in the art.

Suitable pigments for the polycarbonate and polyester resins, and optionally for the other thermoplastic resins, include blue pigments (including violet colors and blue dyes), such as Macrolex Violet 3R and S- 30 PV Echtblau-A2R. It is preferred that the total amount of blue pigment range from about 5 to 400 ppm and more preferably from about 25 to 150 ppm. For example, in the more preferred case, the amount of Macrolex Violet 3R could range from about 20–120 ppm and the amount of the PV Echtblau-A2R could from about 5 to 30 ppm. In the examples which follows, the bluing pigment was a 4/1 ratio of Macrolex Violet 3R and PV Echtblau-A2R with the amounts being in the more preferred ranges.

Suitable dyes that can be employed in dyeing any of the hydrocarbon polymers described herein include those set forth in the annual edition of the "Technical Manual and Yearbook of the American Association of Textile Chemists and Colorists," for example, the 1952 edition. Among such suitable dyes are those illustrated by the α-hydroxyanthraquinone compounds and by the ortho-hydroxyazo compounds, which are capable of undergoing chelation or mordanting with the metals or metal compounds which are incorporated into our hydrocarbon polymers. Thus among the dyes that can be used are those described in U.S. Pat. Nos. 2,641,602 and 2,651,641. These dyes have the structural formulas:

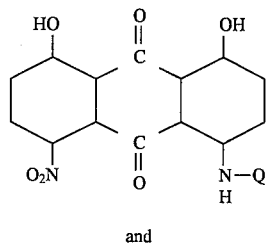

and

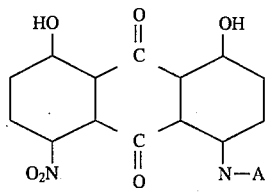

respectively, wherein Q represents a phenyl ethyl alcohol nucleus and A is a monocyclic benzene nucleus containing a

group wherein $R^6$ represents hydrogen, methyl or ethyl. Other dyes which can be used to color the crystallizable polymeric hydrocarbons within the scope of this invention are:

2-(4-acetamidophenylazo)-4-methylphenol
4-hydroxy-1-methyl-3-(m-nitrophenylazo)-carbostyril
1-amino-4,5-dihydroxy-2-methoxyanthraquinone
1-(2-hydroxy-5-sulfonamidophenylazo)-2-hydroxynaphthalene The above dyes are merely representative of dyes that can be used.

The organic phosphorous compound is selected from the group consisting of organic phosphite esters and organic phosphonites. The organic phosphite esters may be, for example, secondary organic phosphites and tertiary organic phosphites.

Secondary and tertiary organic phosphites according to this invention are organic phosphites having a trivalent phosphorus atom and two or three P-O-C linkages (i.e. phosphorus-oxygen-carbon linkage) which may, for example, be described by the formulae

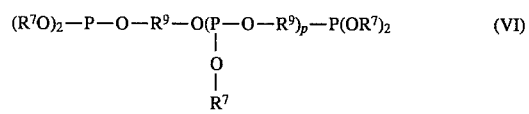

and

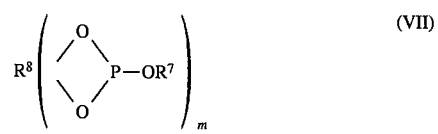

wherein $R^6$ is hydrogen, an aliphatic (preferably $C_8$ to $C_{20}$ alkyl), aromatic (preferably phenyl), alkyl substituted aromatic (preferably $C_7$ to $C_{18}$), aryl substituted aliphatic (preferably $C_7$ to $C_{18}$), cycloaliphatic (preferably $C_6$), diphenyl or phenyl-alkylene-phenyl group having a valence equal to n, $R^7$ an alkyl (preferably $C_8$ to $C_{20}$), hydroxyalkyl, aryl (preferably phenyl), aralkyl (preferably $C_7$ to $C_{18}$), alkaryl (preferably $C_7$ to $C_{18}$), alkenyl or cycloalkyl (preferably $C_6$) group, or $R^7$ groups and optionally the $R^6$ group together with the oxygen atoms and phosphorus atom of the phosphite join to form a heterocyclic ring structure, $R^8$ is a divalent or tetravalent aliphatic, aromatic or cycloaliphatic radical, $R^9$ is an alkylene group optionally containing ether linkages, m is 1 or 2, n is an integer from 1 to 6 and p is an integer from 1 to 1000. The organic phosphonites according to this invention may be, for example, described by the formulae

and

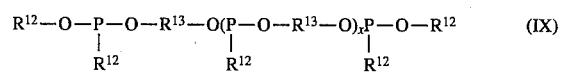

wherein $R^{10}$ is hydrogen, or an aliphatic, aromatic, alkyl substituted aromatic, aryl substituted aliphatic or cycloaliphatic radical having a valence of q, $R^{11}$ is an alkyl, aryl, aralkyl, alkaryl, cycloalkyl or alkeneyl group or the $R^{11}$ groups together with the oxygen atoms and the phosphorus atom may join to form a heterocyclic ring, $R^{12}$ is an alkyl, aryl, aralkyl, alkaryl, cycloalkyl or alkenyl group, $R^{13}$ is an alkylene group optionally containing ether linkages, q is an integer from 1 to 6 and x is an integer from 1 to 1000. The preferred secondary organic phosphites, tertiary organic phosphites and organic phosphonites usable in this invention are those having low volatility, especially at elevated temperatures.

It must be understood, however, that one advantage of the invention is the ability to exclude altogether the presence of a stabilizer such as the phosphite described above. In other words, the present invention can contain only a thermoplastic resin, a brightner and a bluing pigment and still achieve an optically clear, optically bright composition which essentially retains all the remaining physical properties of the resin.

The composition contains (a) thermoplastic resin preferably present at a level of at least 80 percent by weight based on the total weight of the composition, more preferably present at a level of at least 90 percent by weight, more preferably at least 95 percent by weight, and most preferably at least 99 percent by weight based on the total weight of the composition. The brightner compound (b) is a benzoxazolyl optical brightner compound and is present in an amount which will substantially decrease the yellowness value of the composition. It is preferred that that the brightner compound is present in the composition at a level of from about 0.00001 percent to about 1 percent by weight based on the total weight of the composition, more preferably present at a level of from about 0.0001 to about 0.005 percent by weight thereof, and most preferably present at a level of from about 0.0001 to about 0.001 percent by weight thereof. The bluing pigment (c) is present in as small a quantity as feasible and preferably it is present at low enough levels that it will not substantially affect the optical brightness of the composition, e.g., the pigment mixture is preferably present at a level of between about 5 and 400 ppm, more preferably between about 15 and 300 ppm, and most preferably between 25 and 150 ppm. The phosphorus heat stabilizer compound (d), when present in the composition, is also as limited as possible so as not to adversely affect the physical properties of the resin and is preferably present in the composition at a level of less than about 0.03 percent by weight based on the total weight of the composition, more preferably present at a level of from about 0.0001 to about 0.06 percent of the composition, and most preferably present at a level of between about 0.01 and about 0.03 percent by weight of the composition. The preferred phosphorus heat stabilizer compound is tris(2,4-di-tert-butyl) phosphite.

For example, when the resin is a normally clear resin such as polycarbonate, polyester, or the like, the composition preferably exhibits a yellowness index value of at most 2.0, and more preferably exhibits a yellowness index value of at most 1.6. The reduced levels of phosphorus compound in the composition also permit the composition to resist hazing under exposure to moist conditions at elevated temperatures.

The present invention also involves brightener compounds of the formula

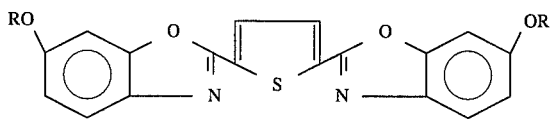

wherein R is selected from the group consisting of: (a) moieties of hydrogen, halogen, alkyl, haloalkyl, hydroxyalkyl, alkoxyalkyl and cyanoalkyl; and (b) thermoplastic resin structures of polycarbonate, polyester, polyolefin, polyvinyl aromatic resins, polyethers and polyimides. The present invention also involves brightener compounds of the formula

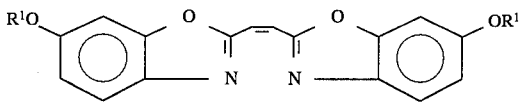

wherein $R^1$ is selected from the group consisting of hydrogen, halogen, alkyl, haloalkyl, hydroxyalkyl, alkoxyalkyl and cyanoalkyl moieties. The brightener compounds are useful in thermoplastic resin compositions when used in combination with the thermoplastic resin.

The pigments may be effectively compounded into the composition either directly or preferably by formation of a premix comprising a blend of pigment with an amount of thermoplastic resin.

EXAMPLES

Haze was determined according to ASTM D1003 using autoclaving at a humidity of 100% at 120 C, Example A contained no phosphite. Example B contained 0.1% tris(2,4-di-t-butylphenyl) phosphite. Example C contained 0.03% tris(2,4-di-t-butyl) phosphite (Irgafos 168); t is in hours time. The compositions were polycarbonate compositions.

| | Haze | | | | | |
|---|---|---|---|---|---|---|
| EX | t(0) | t(50) | t(100) | t(200) | t(380) | T(500) |
| A | 1 | 7 | 11 | 14 | 16 | 22 |
| B | 1 | 8 | 9 | 13 | 40 | 85 |
| C | 1 | 7 | 9 | 12 | 20 | 38 |

The above Examples A, B and C illustrate that while phosphites have a positive effect on melt stabilization, long term stability for polycarbonate resin as measured by haze can be enhanced by utilizing reduced levels of phosphite. Compositions A, B and C did not contain pigment or brightening compound.

| | | Appearance | | | |
|---|---|---|---|---|---|
| EX | Phos | Benz | PM | YI | Appearance |
| D | 0 | 0 | 0 | 3.0 | Yellow/Brownish |
| E | 0.1 | 0 | 0 | 2.1 | Yellow |
| F | 0 | 0 | 0.11 | 2.2 | Yellow/greyish |
| G | 0 | 0.001 | 0 | 1.7 | Bright/slight blueish |
| H | 0.1 | 0 | 0.11 | 1.5 | Natural/greyish |
| I | 0.1 | 0.001 | 0.11 | 0.8 | Bright natural/blueish |
| J | 0.3 | 0 | 0.11 | 1.3 | Natural/greyish |
| K | 0.1 | 0 | 0.13 | 1.4 | Natural/greyish-blue |
| L | 0.03 | 0.0001 | 0.05 | 2.1 | Bright natural/ very slight yellow |
| M | 0.0 | 0.0001 | 0.05 | 2.3 | Bright natural/ slight yellow |
| 1 | 0.03 | 0.0001 | 0.06 | 1.6 | Bright natural |
| 2 | 0.00 | 0.0001 | 0.06 | 1.7 | Bright natural |

Examples D–M and 1 were polycarbonate resin compositions. The amount of the phosphite stabilizer, brightner compound, blue pigment premix and the resultant yellowness values and appearance values are indicated in the table. Note the surprising and unexpected appearance obtained by the presently claimed composition utilizing low amounts of phosphite and low amounts of brightner in combination. The product of Example 1 yielded a YI of 1.6 and a bright natural color. Phos means tris(2,4-di-tertbutyl)phosphite. Benz means 2,2'-(2,5-phenedlyl)-bis(5-tert-butyl benzoxazole). PM means blue pigment premix. YI means yellowness index as measured by photo spectometry according to ASTM D1925-70.

We claim:

1. A transparent pigmented thermoplastic resin composition comprising:

(a) a thermoplastic resin present at a level of at least 80 percent by weight based on the total weight of the composition, wherein said thermoplastic resin is selected from the group consisting of aromatic polycarbonate resins and polyester resins;

(b) a brightener compound of the formula

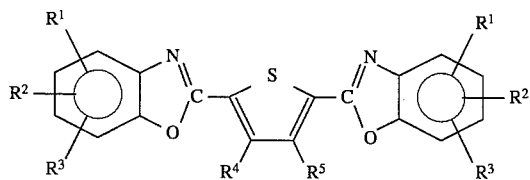

wherein each $R^1$ is selected from the group consisting of hydrogen, halogen, alkyl, haloalkyl, hydroxyalkyl, alkoxy alkyl, and cyanoalkyl; moieties; wherein $R^2$ represents hydrogen, alkyl of 1 to 6 carbon atoms, alkoxy of 1 to 4 carbon atoms and halogen; wherein $R^3$ represents hydrogen, chlorine, or alkyl of 1 to 4 carbon atoms; wherein each $R^4$ and $R^5$ are independently selected from the hydrogen and alkyl moieties, said compound being present at a level sufficient to achieve a significant decrease in the yellowness value of the composition;

(c) a bluing pigment in an amount which does not substantially affect the optical brightness of the composition, wherein said bluing pigment ranges from about 5 to about 400 ppm; and (d) a phosphorous heat stabilizer compound, wherein the amount of heat stabilizer is not sufficient to significantly decrease the hydrolytic stability of the composition.

2. The composition of claim 1, wherein the amount of said brightner ranges from about 0.00001 percent to about 0.01 percent based on the total weight of the composition.

3. The composition claim 2, wherein the amount of said brightner ranges from about 0.0001 percent to about 0.001.

4. The composition of claim 1, wherein the amount of said blueing pigment ranges from about 25 to about 150 ppm.

5. The composition of claim 1, wherein the amount of said heat stabilizer compound is less than about 0.03 percent based on the total weight of the composition.

6. A composition of claim 1 wherein said resin is an aromatic polycarbonate resin.

7. The composition of claim 1 wherein said composition is transparent and has a yellowness index value of at most 2.0.

8. The composition of claim 1 wherein said resin is polyalkylene terephthalate.

9. The composition of claim 1 wherein said brightner compound is of the formula

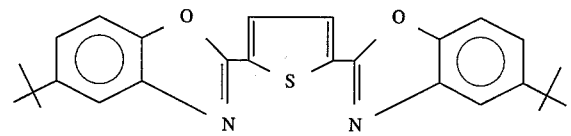

10. The composition of claim 1 wherein said composition consists essentially of said resin, brightner compound, pigment and phosphorous compound.

11. The composition of claim 1 wherein said phosphorous compound is an organic phosphite ester.

12. The composition of claim 11 wherein said phosphite is tris(2,4 di-tert-butyl)phosphite.

13. The composition of claim 1 wherein the amount of said heat stabilizer is sufficiently low that the haze number according to ASTM D1003 is lower than 35 after 500 hours.

14. The thermoplastic composition of claim 1 wherein said thermoplastic resin is present at a level of at least 99 percent by weight based on the total weight of the composition.

* * * * *